Feb. 11, 1969 KATSUYA ATSUMI 3,427,409
MAGNETIC HEAD ARRANGEMENT WITH RECORDING AND REPRODUCING
HEADS ON OPPOSITE SIDES OF TAPE RECORD
Filed Sept. 14, 1965

INVENTOR.
KATSUYA ATSUMI
BY
KARL RATH
ATTORNEY

INVENTOR.
KATSUYA ATSUMI
BY
KARL RATH
ATTORNEY

United States Patent Office 3,427,409

Patented Feb. 11, 1969

3,427,409

MAGNETIC HEAD ARRANGEMENT WITH RECORDING AND REPRODUCING HEADS ON OPPOSITE SIDES OF TAPE RECORD

Katsuya Atsumi, 14 2-chome-12, Higashi-Kohjiya, Ohta-ku, Tokyo, Japan

Filed Sept. 14, 1965, Ser. No. 487,125
U.S. Cl. 179—100.2 6 Claims
Int. Cl. G11b 5/48

ABSTRACT OF THE DISCLOSURE

In a magnetic head assembly for tape recorders a recording head is arranged with its recording gap in contact with the non-magnetic base of the moving recording tape and a separate playback head, having a reproducing gap of a width being a substantial submultiple of the width of the recording gap, is arranged in contact with the magnetic layer of the tape. The playback head is displaced relative to the recording head in the traveling direction of the tape to a position of the reproducing gap being within the effective working range of the recording gap.

This invention relates to improvements in or relating to head arrangements of magnetic tape recording and reproducing machines which will be referred to briefly as "tape recorders."

Recently advanced technique in this field of engineering has aimed at the high density recording which is especially valuable in the field of video tape recorders for attaining clear and sharp reproduced images.

At first, considering conventional audio tape recorders, the signal density commonly employed is in the order of 15 kc./sec./19 cm./sec., when the conventional magnetic head arrangements are employed other than the crossfield heads so-called by those skilled in the art. This compound ratio may be briefly expressed by 0.8 kc./cm. Or more specifically, the signal density is about 0.8 kc. per 1 cm. On the other hand, the corresponding and comparative ratio may be expressed in the case of advanced modern video tape recording technique by 1000 kc./sec./150 cm./sec., or briefly 6.6 kc./cm.

Thus, when comparing the commonly employed signal density in the video tape recording technique with that of the audio technique, the former is as high as about 8 times the latter.

It is thus a requisite design requirement for attaining the aforementioned order of high density magnetic recording that the electromagnetic conversion efficiency of the magnetic head arrangement is a maximum for either magnetic recording or reproducing.

In the old-fashioned conventional tape recorders, the recording head and the reproducing head are most frequently combined into one, so as to minimize the overall number of magnetic heads of the machine. According to more advanced techniques, both types of heads are separately provided for attaining a maximum possible electromagnetic conversion efficiency in either magnetic recording or reproducing.

With use of such separately arranged recording and reproducing magnetic heads, it is absolutely necessary in the course of the manufacture of tape recorders to perform a highly cumbersome and time-consuming azimuth adjustment for realizing a practically true parallelism between the slit gaps of the both heads. Various other defects known to those skilled in the art will also appear with use of such separated heads.

For avoiding these difficulties, it has already been proposed to adopt the so-called outside coil type recording head wherein a ferrite core having a broader non-magnetic gap is placed at the rear side of the magnetic tape, while a pole piece with a narrower or finer non-magnetic gap is provided on the front or magnetic side of the tape, said pole piece being provided with a copper block for reducing otherwise possible stray or leakage magnetic fluxes.

The technical reason for such a magnetic head arrangement derives especially from the consideration of modern development of highly finer non-magnetic gaps adapted for high density recording, in addition to other technical difficulties. With use of such recording heads having highly fine slit gaps, the frequency response will be substantially improved and the recording density is highly concentrated so that the tape feed speed may be reduced without sacrificing appreciably the quality of reproduced signals.

The finer the slit gap of the recording head of conventional design the weaker effective recording magnetic fluxes emanating from the recording gap of the magnetic head whereby a substantial part of the induced fluxes in the head will flow through the core in the form of a leakage magnetic circuit, providing substantially no recording effects upon the magnetic layer of the tape. With use of the above-mentioned outside coil recording head, the induced fluxes from the recording winding wound around the ferrite core will flow through the core and then across the tape to the pole piece oppositely mounted to the core. The thus transferred fluxes will flow superficially along the front surface of the pole piece including the fine slit gap, whereby a considerable part of the transferred fluxes will flow across the latter for performing the recording operation.

It is claimed that the outside coil recording head arrangement improves considerably the high frequency response. The provision of the copper block serves for accelerating the superficial flow of the transferred fluxes.

In spite of the improvements so far described, the outside coil recording head arrangement can not provide the possibility of reproducing the recorded signals on the tape. For this purpose, a separate playback head must be provided, which addition will again involve the necessity for the cumbersome azimuth adjustment of slit gap parallelism.

It is therefore the main object of the present invention to provide a unique and improved head arrangement comprising only one recording and one playback head which arrangement provides a unique possibility for both recording and reproducing signals by means of a single slit gap arranged on the magnetic side of the running tape, thus obviating the disadvantageous azimuth adjustment.

A further object of the invention is to provide magnetic head arrangement having a superior high frequency response.

A still further object of the invention is to provide a magnetic head arrangement enabling a more convenient and efficient mode of monitoring operation than the conventional technique.

A still another object of the invention is to provide a magnetic head arrangement having an improved electromagnetic conversion efficiency.

The main characterizing feature of the present invention for the realization of the aforementioned objects resides in the fact that a recording head with a considerably broader non-magnetic gap is provided at the non-magnetic base side of a conventional magnetic head and that a reproducing head with considerably finer non-magnetic gap in comparison with the former gap is mounted at the magnetic side of the tape, the latter gap being positioned oppositely within the working range of and displaced from the former gap as viewed in the tape running direction. The minimum ratio of the latter gap relative to the former gap may be for instance 10.

These and further objects, features and advantages of the invention will be more apparent to those skilled in the art from a consideration of the following detailed description when taken together with the accompanying drawings in which.

Figure 1:
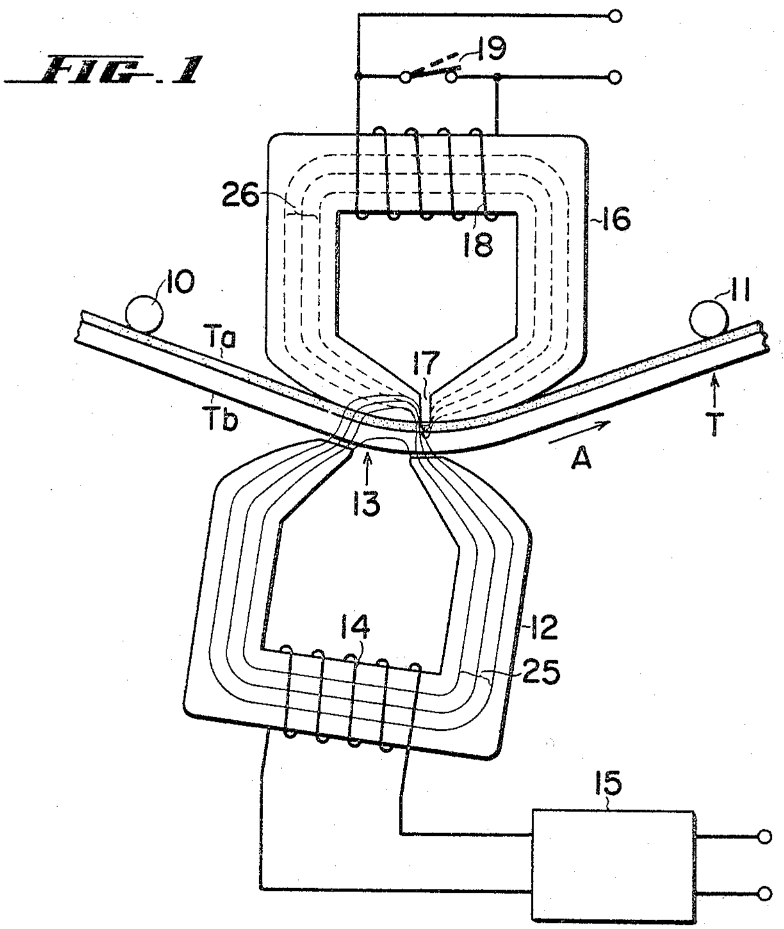
FIG. 1 is a schematic representation of a first embodiment of the head arrangement of the present invention.

Now referring to the accompanying drawings, several preferred embodiments of this invention will be described more in detail.

In FIG, 1, reference symbol T represents an elongated magnetic recording and playback medium, hereinafter briefly denoted as "the tape," which is guided from a tape feed reel (not showing) by a plurality of stationary guides, only two of the latter being shown herein as at 10 and 11. These guides are preferably studded on a chassis panel, not shown, of a magnetic tape recording and playback machine, hereinafter briefly denoted as "the machine." Tape T is guided to travel in the direction as indicated by an arrow A and wound up by a take-up reel, not shown, as conventionally. The tape comprises a magnetic layer T*a* which is coated as conventionally on a plastic base T*b*.

At the back or base side of the tape T, there is arranged a record head which has normally a considerably broader air gap 13 than that denoted by 17 of the playback head 16 as shown. Recording coil 14 is wound around the first head 12 as conventionally and electrically connected with a recording amplifier 15. Although not shown, the record head coil 14 may preferably be excited by A.C. or D.C. biasing current superposed upon the recording current, as conventionally.

The playback head 16 is arranged at the front or upper side of the tape as shown and the air gap 17 of the head is displaced in the travelling direction of the tape, to a point within the effective working zone of record head gap 13, or in a close proximity thereof. As shown, the record head 12 is advanced relative to the playback head 16 a considerable distance in respect to the travelling direction of the tape.

In addition, the record head makes an angle with an imaginary line which is perpendicular to the axis of playback head 16 passing through the gap 17. These measures are effective to concentrate the biasing magnetic fluxes at the gap 17 and thus the recorded signals on the tape are not substantially affected adversely by the biasing fluxes within the trailing zone extending from the gap towards tape guide 11. Otherwise, the recorded signals would be weakened or even cancelled, especially those of higher frequencies.

Playback coil 18 is electrically connected through a switch 19 to playback amplifier 20 (FIG. 3), said coil being provided with a center tap 21. This tap and earth line 22 of said switch 19 are electrically connected through an amplifier 23 to a monitoring unit 24 (FIG. 3).

The switch 19 may be mechanically or electrically coupled with a conventional record-playback control means, which may be in the form of a push-button, knob or lever.

When a D.C. biasing current is superposed on the coil 14 of recording head 12, there must be no provision of amplifier as at 15. This modified arrangement is especially useful for video tape recorders, because in this case otherwise possible difficulties for feeding higher frequency biasing currents may be obviated in a simple manner.

Figure 3:
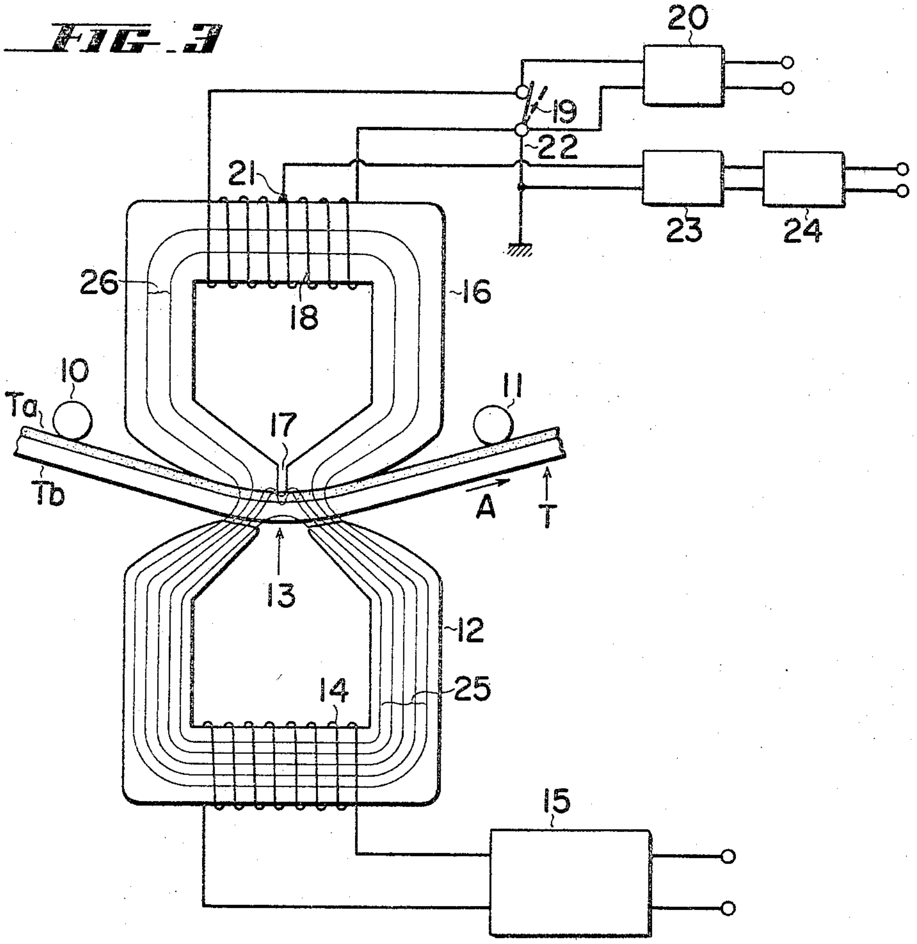
FIG. 3 is a similar view to FIG. 1, illustrating a second embodiment of the invention.

In the recording operation, switch 19 is in the "on" position, as shown with full line in FIGS. 1 and 3 for short-circuiting the coil 18.

When the coil 14 is energized through the recording amplifier 15 by a signal current under these conditions, the induced magnetic fluxes 25 flow through the core of recording head 12 and then pass across the tape and finally substantial part of the fluxes will flow superficially through the leading part of the core of playback head 16, whereby the signal information is recorded magnetically on the magnetic layer T*a* of the tape through the playback gap 17, the width of the latter being a substantial submultiple of the recording gap 13.

If coil 18 were not provided, a substantial part of the recording fluxes transferred from record head to playback head would flow as leakage fluxes, denoted herein by dotted lines 26, through the closed magnetic circuit composed by the whole ring core of the head 16. In the present embodiment, however, the coil 18 is short-circuited in the present mode of operation as described hereinbefore, thus this coil will act efficiently as a damper on account of its counter electromotive function, whereby the otherwise possible leakage fluxes are substantially suppressed. In this way, the main and effective magnetic fluxes passing the head gap 17 can be considerably increased and ineffective leakage fluxes may be reduced to a minimum. It will be noted that by the provision of short-circuited damper coil 18 the possible leakage fluxes are positively driven in effect from the corresponding magnetic circuit into the main circuit.

In order to initiate the playback operation, switch 19 is opened as shown by dotted line in FIGS. 1 and 3, whereby coil 18 is electrically connected with playback amplifier 20. The gap 17 of the playback head is also kept in physical contact with magnetic layer T*a* of the tape which runs in the same direction as before, shown by the arrow A. It is understood that in this case that both the recording and biasing currents are cut off.

Figure 2:
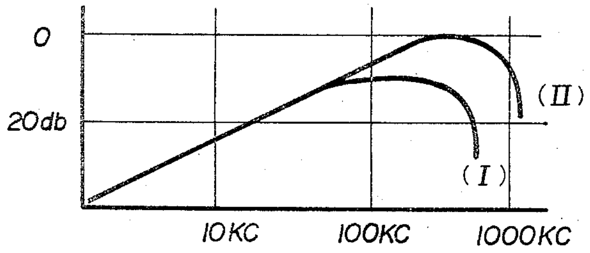
FIG. 2 is a frequency response characteristic shown in comparison with a conventional one.

In FIG. 2, a frequency response curve II is shown in comparison with the characteristic curve I of a conventional record head arrangement. It will be seen with use of the novel arrangement described, the high frequency response can be substantially improved.

In the arrangement shown in FIG. 3, the both heads, 12 and 16 are arranged correctly oppositely to each other. Under certain conditions, this arrangement may be well adopted for the desired purpose.

In the recording operation, currents are induced in the coil 18 of head 16 and a part thereof is fed through amplifier 23 to monitoring device 24 of conventional design.

Figure 4:
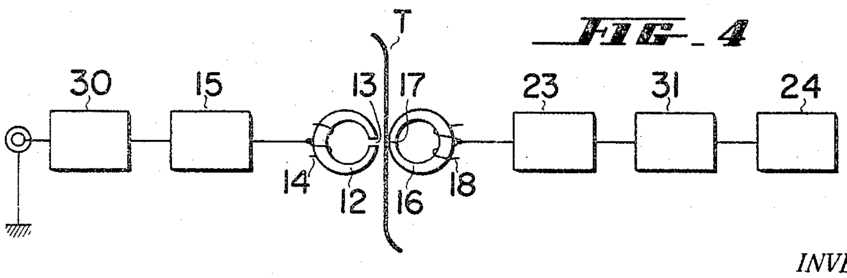
FIG. 4 is a simplified block diagram of the arrangement shown in FIG. 3.

In FIG. 4, numeral 30 denotes a modulator and 31 represents a demodulator, the both being of the conventional design. According to previous arrangements, monitoring currents are taken from the record head side, while according to the novel arrangement the currents are taken from coil 18 via the magnetic fluxes of the recording head after passage across the tape, whereby practical recording operation may be substantially positively monitored.

In the recording operation, the superficial flux current transferred from the recording head 12 to the playback head 16, assisted further by the damping coil 18, is led substantially across the fine gap 17, thereby a sharp and strong flux bundle emanates therefrom and is utilized for recording on the magnetic layer T*a* of tape T.

In the case of the aforementioned outside coil recording system, the reproducing operation is carried out by the recording head per se. This arrangement will invite a considerable large spacing loss during the reproducing operation. Thus, even when higher frequency signals have been recorded on the tape, the reproduction of such signals may be encountered with much difficulties, or even in a failure.

With use of the head arrangement according to this invention, however, higher frequency signals can be easily recorded and reproduced by employing a finest possible size for the gap 17.

For carrying out the reproducing operation, switch 19 is moved to "off" position, for electrically connecting the damper coil 21 to playback amplifier 20, the damper coil thus effectively acting as a conventional playback coil.

It is a great advantage with use of the novel head arrangement according to the invention in that the core loss for high frequencies is very small as will be clear from the foregoing.

With the present novel head arrangement, the recording is carried out with recording fluxes which are delivered from the back side of the tape and thus the magnetization of the magnetic layer of the latter at high signal frequencies can be realized to a considerable depth in comparison with the conventional head arrangement wherein the recording magnetic fluxes are supplied to the tape from the magnetic layer side thereof. Thus, according to the invention, enough penetration of magnetization for successful recording and reproducing of higher frequency signals may be assured.

In addition, a higher recording efficiency is attained than that with the conventional technique, because in the inventive head arrangement enables a better matching between the amplifier and the respective head.

Still further, according to this invention, the sole operating slit gap as at 17 can be designed with a minimum width to meet occasional demands. If this measure should be employed for the conventional head arrangement, a large amount of recording fluxes would be led in a leakage circuit established in the recording head core whereby the amount of the effective fluxes emanating from the recording slit gap onto the tape magnetic layer will become small. According to this invention, this drawback can be effectively remedied.

On the other hand, a finest possible operating gap can be easily utilized for the playback operation, and the picked-up energy can be utilized even when the playback operation is being carried out.

In the foregoing the invention has been described in reference to specific illustrative devices. As will be understood, various changes may be made in the form of details, arrangement and proportion of the parts, etc., without departing from the broader spirit and scope of the invention as set forth in the appended claims.

I claim:

1. A magnetic head arrangement for tape recorders comprising in combination:

(1) a recording head including a recording gap and carrying a recording coil, (2) a magnetic tape having a non-magnetic base and a magnetic layer carried thereby, said tape arranged to move across said recording gap with said base in surface contact with said head, (3) a playback head including a reproducing gap and carrying a playback coil, said reproducing gap having a width equal to a substantial submultiple of the width of said recording gap, (4) said playback head arranged with its reproducing gap in contact with the magnetic layer of said tape, and (5) said playback head being displaced relative to said recording head in the traveling direction of said tape to a position within the effective magnetic working range of said recording gap.

2. A magnetic head arrangement as claimed in claim 1, the width of said recording gap being at least ten times the width of said reproducing gap.

3. A magnetic head arrangement as claimed in claim 1, wherein said playback head is arranged with its gap axis forming an angle with the gap axis of said record head.

4. A magnetic head arrangement as claimed in claim 1, including switch means for short-circuiting said playback coil, to cause the same to act as damping means for minimizing the non-effective leakage flux through said playback head during recording.

5. A magnetic head arrangement as claimed in claim 4, said switch means designed to selectively short-circuit and to connect said reproducing coil to a playback amplifier, respectively.

6. A magnetic head arrangement as claimed in claim 4, including a monitoring device connected to a fractional portion of said playback coil.

References Cited

UNITED STATES PATENTS

| | | | |
|---|---|---|---|
| 3,126,456 | 3/1964 | Guckenburg | 179—100.2 |
| 3,230,517 | 1/1966 | Supernowicz | 179—100.2 |

STANLEY M. URYNOWICZ, Jr., *Primary Examiner.*

J. R. GOUDEAU, *Assistant Examiner.*

U.S. Cl. X.R.

340—174.1